C. S. BURTON.
MILEAGE PERIOD SIGNALING DEVICE.
APPLICATION FILED JAN. 28, 1921.
1,395,256.
Patented Nov. 1, 1921.
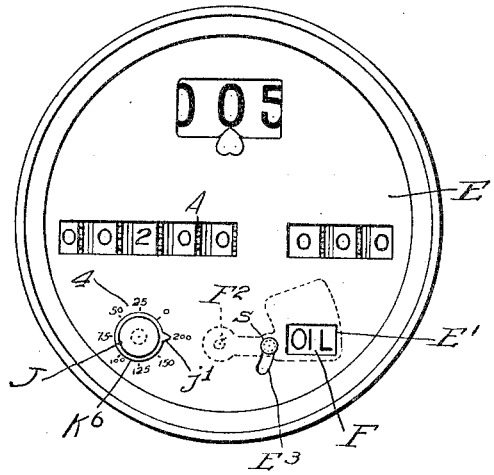
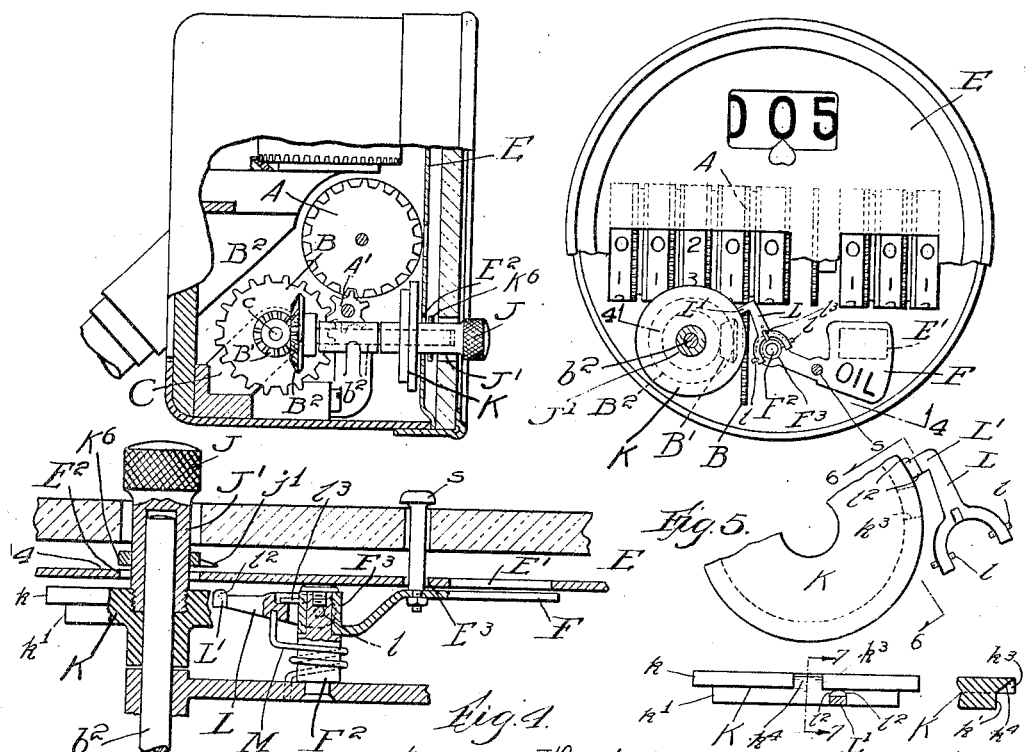

UNITED STATES PATENT OFFICE.

CHARLES S. BURTON, OF OAK PARK, ILLINOIS, ASSIGNOR TO STEWART-WARNER SPEEDOMETER CORPORATION, OF CHICAGO, ILLINOIS, A CORPORATION OF VIRGINIA.

MILEAGE-PERIOD-SIGNALING DEVICE.

1,395,256.         Specification of Letters Patent.    Patented Nov. 1, 1921.

Application filed January 28, 1921. Serial No. 440,604.

*To all whom it may concern:*

Be it known that I, CHARLES S. BURTON, a citizen of the United States, and a resident of Oak Park, in the county of Cook and State of Illinois, have invented certain new and useful Improvements in Mileage-Period-Signaling Devices, of which the following is a specification, reference being had to the accompanying drawings, forming a part thereof.

The purpose of this invention is to provide an odometer with a signaling device intended to be operated periodically upon the completion by the odometer of a predetermined mileage record of the vehicle served by the instrument for calling attention of the driver to some requirement of the vehicle or its motor. It consists in the elements and features of construction shown and described as indicated in the claims.

In the drawings:—

Figure 1 is a face view or elevation of a speedometer comprising an odometer train and indicating devices and equipped with devices which constitute the present invention.

Fig. 2 is a side elevation of the odometer mechanism, the casing being broken away to disclose the same.

Fig. 3 is a face view with the face plate partly broken away to disclose the mechanism.

Fig. 4 is a detail section at the line, 4—4, on Fig. 3.

Fig. 5 is a detail plan view of a tripping disk and coöperating dog.

Fig. 6 is a section at the line 6—6, on Fig. 5.

Fig. 7 is a section at the line, 7—7, on Fig. 6.

Figs. 8, 9 and 10 are views similar to Figs. 6, 7 and 8, (omitting the dog), showing a slight modification.

Figs. 11 and 12 are views similar to Figs. 6 and 7 showing another modification.

The drawings show an odometer train and face plate of familiar construction, requiring no description as to details beyond indicating certain wheels with which the auxiliary train provided for the purpose of the present invention is connected.

A is a gear fixed with respect to the tens column number wheel of the front of the odometer number train, said number wheel, and therefore said gear, making one revolution for each one hundred miles travel of the vehicle indicated by the odometer. $A^1$ is a pinion which meshes continuously with the gear, A, revolving tooth-by-tooth with said gear. These two wheels are parts of the original odometer train. B is a gear having the same number of teeth as the gear, A, which meshes with the pinion, $A^1$, having bearings provided for it at $c$ on a bracket, C, which is mounted in any convenient manner fixedly with respect to the odometer train support or casing. Rigid with the gear, B, is a beveled pinion, $B^1$, which meshes with a beveled gear, $B^2$, having more than twice the number of teeth of the beveled pinion, so that it will make one revolution in something more than two hundred miles travel indicated by the odometer. Suitable bearing is provided for the shaft, $b^2$, of the beveled gear, $B^2$, which shaft extends at right angles to the face plate, E. Said face plate has a signal aperture, $E^1$. Back of the plate there is mounted a signal, F, pivoted by means of the spindle, $F^2$, for swinging to display through the aperture and to remove from display position, a signal suitable for indicating the attention required and of which it is the purpose of the particular device to warn the driver of the vehicle. In the present instance the particular attention contemplated is to supply lubricant to the motor; and consequently the target carries the signal "Oil"; and the target has a width at the point at which it swings past the open face somewhat more than double that required for said signal "Oil," so that at one limit of its movement the signal may be displayed through the side opening, and at the other limit said side opening may be closed by a blank area of the target, said signal being concealed behind the face plate.

The face plate, E, has an aperture, $E^2$, alined with the shaft, $b^2$, and upon the upwardly protruding end portion of said shaft, $b^2$, there is mounted a hollow sleeve shaft, $J^1$, telescoped thereon with a rather tight frictional fit and having a knob, J, accessible above the face plate for rotating the sleeve to adjust it and the parts which it carries as hereinafter described, relatively to the shaft, $b^2$, and to the odometer train and readings. Rigid with the sleeve shaft, $J^1$, is a disk, K, which constitutes one member of a tripping device, of which the other member is a dog hereinafter mentioned. The disk, K, has its periphery at $k$ constituting one track for the dog, and said disk is rabbeted or cut back in diameter forming a second track at $k^1$, laterally situated with respect to the track, A, and radially inward therefrom. At one point in the circumference of the track, K, it is interrupted by a notch, $k^3$, of which the back or bottom is sloped as seen at $k^4$, so as to present an inclined guideway for the dog to cause the latter when it runs off the outer track, $k$, into said notch, to be deflected laterally while it is moving radially, and thereby caused to reach and lodge upon the inner and laterally situated track, $k^1$. The dog referred to is shown at L, pivoted at $l$ to the hub, $F^3$, of the target, F, by which said target is pivotally mounted above the stud, $F^2$, for swinging as described in a plane parallel to the face plate; and said dog, it will be observed, by being pivoted as described to said hub, is adapted for swinging in a plane transverse to the plane of the target. The stud is positioned and the dog extended therefrom so that the nose, $L^1$, of the dog may ride upon either of the tracks, $k$ or $k^1$, of the disk, K, the dog turning about its pivot at $l$, bringing its nose into the plane of one track or the other. A spring, M, coiled about the stud, $F^2$, has one end engaged with the stud and the other end engaged with the dog, L, reacting on the dog for swinging the dog and the target about the pivot stud in the direction for displaying the signal "Oil" at the signal aperture, $E^1$; and the target is provided with a pin, $s$, which projects through an arc slot $E^3$, in the face plate to limit the swing of the target, the pin being accessible outside the face plate for restoring the target to signal-concealing position. The spring, M, besides reacting in the manner described for swinging the target about its pivot, reacts upon the dog for swinging it upwardly about the pivots of the dog, L, that is, to the position at which the nose of the dog will be in the plane of the track, $k$, and adapted to ride thereon.

The knob, J, has appended to it a disk, $K^6$, of suitable diameter and suitably positioned to cover and close the aperture, $E^2$, through which the sleeve shaft emerges through to the face plate, and upon the face plate is a circle around the margin of the disk, $K^6$, there is imprinted a mileage scale which in the present instance is graduated from 1 to 200, the graduated portion occupying such a proportionate part of the entire circle as 200 is of the mileage which would be indicated by the odometer in one complete revolution of the shaft, $b^2$, which, as above indicated, is more than 200 miles, thus leaving a small sector of a circle without graduation.

The operation of the device for the purpose indicated is as follows:

The normal position of the parts is designed to be with the target at signal-concealing position; and upon its being moved to that position by means of the pin, $s$, it will be seen that the dog, L, will be swung out radially with respect to the disk, K, and that thereupon the spring, M, will cause it to swing laterally over into the plane of the track, $k$; and a stop pin, $l^3$, is provided on the hub, $F^3$, of the target, to check the dog at that position, preventing it from swinging farther in the direction of the stress of the spring. The operator will now turn the knob, J, to bring the index mark, $j^1$, to the figure on the graduated scale, 4, which denotes the number of miles of travel which should elapse before the next attention will be required to the matter which the signal indicates,—in the present instance, the oiling. If in this adjustment the notch, $k^3$, in the track, $k$, is carried past the nose of the dog, the target will be operated and set at signal-displaying position, and the operator will thereupon, after completing the adjustment by means of the knob, re-set the target to signal-concealing position, which will cause the dog's nose to be lodged upon the track, $k$, at a distance from the notch, $k^3$, in the direction of rotation of the disk corresponding to the number of miles for which the operator has set the disk as above described; and when the odometer has been operated by the travel of the vehicle that number of miles, the notch, $k^3$, having reached the nose of the dog, the target will be operated and swung to signal-displaying position, and the nose of the dog will thereafter ride upon the track, $k^1$, until the operator, having performed the requirement indicated by the signal, resets the disk, K, and returns the target to signal concealing position.

Figs. 8, 9 and 10 show a slight modification in respect to the sloping shoulder for guiding the dog laterally after it leaves the outer track, $k$, for lodging on the inner track, $k^1$. In this form the notch, $k^{30}$, substituted for the notch, $k^3$, of the previously described form, is cut entirely through the flange, $k$, the sloping bottom, $k^4$, being substituted by the flat bottom, $K^{40}$, and instead of said slope the farther wall of the notch is beveled as seen at $K^{41}$ to guide the dog laterally after it has been forced in radially into the notch. The form having the slope, $k^4$, is preferable simply because it permits the adjustment of the disk, K, in reverse direction to the point at which it may be desired to reset it after tripping. And in this form, to prevent possibility of the nose of the dog being engaged by the abrupt sides of the notch in whichever direction the resetting is done, the extermity of the nose of the dog is slightly expanded at the side which will be spring-held toward and against the flange when the dog is riding on the inner track and the expanded corner is rounded as seen at $l^2$, so that there is afforded a slight clearance between the side of the flange and the lateral edge of the dog, and the rounded corner, $l^2$, insures against the projection engaging the side of the notch.

It will be obvious that the end of the slot, $E^3$, encountered by the operating pin, $s$, may be relied upon to control the position of the dog while the signal is at display position and in that case the track, $k^1$, may be omitted from the disk, K. An objection to relying on the slot for this purpose is that it involves more exact positioning of the dial in the case than is otherwise necessary. The same result of positioning the dog during display of the signal may be effected without the track, $k^1$, by giving the arm of the dog a width in excess of the width of the tooth or nose, $L^1$, which will ride on the track, $k$, when the nose has dropped into the notch, $K^{40}$. This expedient is shown in Figs. 11 and 12, the excess width being seen at $L^{10}$. I intend it to be understood that my invention in this respect is not limited to a construction having the track, $k^1$, on the disk, K, but includes any suitable means for positioning the dog during display of the signal.

I claim:—

1. In combination with a vehicle-operated odometer train, a signaling device for indicating the requirements of the vehicle or its motor, comprising a target for displaying or concealing the signal; a tripping device for operating the target consisting of a part rotated by the odometer train, and a dog coöperating therewith spring-actuated for riding on said rotating part during signal-concealing position of the target, and for being tripped by said part for moving the target into signal-displaying position; said dog being operatively connected with the target for movement of each by the other in the shifting of the target from one position to the other.

2. In the construction defined in claim 1, foregoing, the odometer-rotated part being adjustable about the axis of its rotation with respect to the odometer train, and manually-operable means for so adjusting it.

3. In combination with a vehicle-operated odometer train, a signaling device for indicating a requirement of a vehicle or its motor, comprising a target for displaying or concealing the signal; a tripping device for operating the target consisting of a part rotated by the odometer train, and a dog cooperated therewith spring-actuated for riding on said rotated part during signal-concealing position of the target, and for being tripped by said part for moving the target into signal-displaying position, and manually-operable means for restoring the target to signal-concealing position.

4. In the construction defined in claim 1 foregoing, the odometer-rotated part being adjustable about the axis of its rotation with respect to the odometer train, manually-operable means for so adjusting it, and manually operable means for restoring the target to signal-concealing position.

5. In the construction defined in claim 1 foregoing, manually operable means for restoring the target to signal-concealing position, the odometer-rotated part being adjustable about its axis of rotation with respect to the odometer train; manually-operable means for so adjusting it, and means by which the dog is restored to its riding position on the odometer-rotated part in the movement of the target to signal-concealing position.

6. In combination with a vehicle-operated odometer train, a signaling device for indicating the requirement of the vehicle or its motor, comprising a target for displaying or concealing the signal; a tripping device for operating the target consisting of a part rotated by the odometer train, and a dog coöperating therewith spring-actuated for riding on said rotated part during the signal-concealing position of the target, and for being tripped by said part for moving the target into signal displaying position; the target being pivoted for swinging from one position to the other, and the dog being pivoted to the target for swinging in a plane transverse to that of the target's movement about its own pivot; the odometer-train-rotated part and the dog having coöperating areas affording two tracks for one of said parts on the other, one radially inward from the other to accommodate the swing of the target about its pivot, and laterally offset from said other to accommodate the movement of the dog about its pivot to the target, and means for guiding the dog laterally after it starts to move radially for shifting the lodgment from one track to the other.

7. In the construction defined in claim 6, foregoing, the two tracks being on the odometer-train-rotated part.

8. In the construction defined in claim 6, foregoing, the expedient for tripping the dog being a notch in the odometer-train-rotated part, said notch having an inclined wall sloping laterally for deflecting the dog laterally out of the zone of the track on which it rides before tripping, in its radial movement into the notch.

9. In the construction defined in claim 1, foregoing, the said operative connection between the dog and the target being that the target is pivoted for swinging from one position to the other, and the dog pivoted to the target for swinging in a plane transverse to that of the target while rocking the target about its own fulcrum and a spring reacting between the fulcrum support of the target and the dog for retracting the dog in its tripped movement and retracting the target to signal displaying position.

In testimony whereof, I have hereunto set my hand at Chicago, Illinois, this 24th day of January, 1921.

CHARLES S. BURTON.